(12) United States Patent
Yamanaka et al.

(10) Patent No.: US 12,673,359 B2
(45) Date of Patent: Jul. 7, 2026

(54) RACK BAR AND STEERING DEVICE

(71) Applicant: HITACHI ASTEMO, LTD.,
Hitachinaka (JP)

(72) Inventors: Shinichi Yamanaka, Hitachinaka (JP);
Daisuke Hamanaka, Hitachinaka (JP);
Norihiro Kimura, Hitachinaka (JP);
Keisuke Kitamura, Hitachinaka (JP)

(73) Assignee: HITACHI ASTEMO, LTD.,
Hitachinaka (JP)

( * ) Notice: Subject to any disclaimer, the term of this
patent is extended or adjusted under 35
U.S.C. 154(b) by 0 days.

(21) Appl. No.: 18/690,433

(22) PCT Filed: Jul. 7, 2022

(86) PCT No.: PCT/JP2022/026909
§ 371 (c)(1),
(2) Date: Mar. 8, 2024

(87) PCT Pub. No.: WO2023/037743
PCT Pub. Date: Mar. 16, 2023

(65) Prior Publication Data
US 2024/0375170 A1     Nov. 14, 2024

(30) Foreign Application Priority Data

Sep. 13, 2021     (JP) ................................. 2021-148485

(51) Int. Cl.
*B21K 1/76*      (2006.01)
*B21J 5/02*      (2006.01)
(Continued)

(52) U.S. Cl.
CPC ................. *B21K 1/767* (2013.01); *B21J 5/02*
(2013.01); *B62D 3/12* (2013.01); *F16H 55/26*
(2013.01)

(58) Field of Classification Search
CPC ... B21K 1/767; B21J 5/02; B62D 3/12; F16H
55/26
See application file for complete search history.

(56) References Cited

U.S. PATENT DOCUMENTS

2012/0248724 A1* 10/2012 Watanabe ................ B62D 3/12
280/93.514
2014/0060956 A1* 3/2014 Takai .................. B23K 20/2275
180/444
(Continued)

FOREIGN PATENT DOCUMENTS

DE         10258807 A1 * 7/2004   ............. B62D 3/126
EP          2676865 A2 * 12/2013   ............. B21J 13/02
(Continued)

OTHER PUBLICATIONS

International Preliminary Report on Patentability dated Mar. 28,
2024 issued in International Application No. PCT/JP2022/026909,
with English translation, 12 pages.
(Continued)

*Primary Examiner* — Zakaria Elahmadi
(74) *Attorney, Agent, or Firm* — FOLEY & LARDNER
LLP

(57) ABSTRACT
In a rack bar and a steering device using the same, an
endmost tooth bottom for reducing a stress exerted on a first
forging die during die forging of a rack tooth molding part
is formed on the endmost side of a plurality of tooth bottoms.
Specifically, the endmost tooth bottom is formed so that a
depth thereof is less than a depth of an ordinary tooth bottom
by a difference. This reduces an amount of flow of a material
of the rack bar during formation of the endmost tooth bottom
by an amount commensurate with the difference. As a result,
the stress exerted on the first forging die can be reduced, and
occurrence of heat checking in the first forging die can be
suppressed.

14 Claims, 9 Drawing Sheets

(51) Int. Cl.
B62D 3/12 (2006.01)
F16H 55/26 (2006.01)

(56) References Cited

U.S. PATENT DOCUMENTS

| | | | |
|---|---|---|---|
| 2015/0020618 A1* | 1/2015 | Kawakubo | F16C 29/02 |
| | | | 74/30 |
| 2018/0128363 A1 | 5/2018 | Hagiwara et al. | |
| 2018/0221938 A1* | 8/2018 | Mizutani | B23P 15/14 |
| 2018/0257696 A1* | 9/2018 | Ikeda | F16H 55/283 |

FOREIGN PATENT DOCUMENTS

| | | | | | |
|---|---|---|---|---|---|
| JP | 57073269 A | * | 5/1982 | | B62D 3/12 |
| JP | S57-73268 A | | 5/1982 | | |
| JP | 03138042 A | * | 6/1991 | | B21K 1/12 |
| JP | 2017-044228 A | | 3/2017 | | |
| JP | 2020-192681 A | | 12/2020 | | |
| WO | WO-2015111595 A1 | * | 7/2015 | | B21K 1/767 |
| WO | WO-2017033995 A1 | * | 3/2017 | | B21K 1/762 |

OTHER PUBLICATIONS

International Search Report dated Sep. 27, 2022 issued in International Application No. PCT/JP2022/026909, with English translation, 6 pages.

* cited by examiner

RACK BAR AND STEERING DEVICE

TECHNICAL FIELD

The present invention relates to a rack bar and a steering device.

BACKGROUND ART

Patent Document 1 cited below discloses an example of a conventional rack bar.

The rack bar disclosed in Patent Document 1 is molded by so-called die forging, i.e., sandwiching a solid and round-bar-shaped stock between an upper die and a lower die and causing a material of the stock to plastically flow, and includes a rack tooth molded part within a predetermined axial range of a rack body.

PRIOR ART DOCUMENT(S)

Patent Document(s)

Patent Document 1: JP 2020-192681 A

SUMMARY OF THE INVENTION

Problem(s) to be Solved by the Invention

The above die forging performed by causing the material of the stock to plastically flow may yield a heat check such as a crack in the upper die structured to form the rack tooth molded part, upon forming an endmost one of tooth bottom lands of the rack tooth molded part that is an end of the plastic flow. However, the conventional rack bar as described above fails to consider the heat check.

In view of the foregoing technical problem, it is desirable to provide a rack bar and a steering device that serve to suppress a heat check from being yielded in a forging die upon die forging of the rack bar.

Means for Solving the Problem(s)

According to one aspect of the present invention, tooth bottom lands include an endmost tooth bottom land that is an endmost one of the tooth bottom lands and is structured to reduce a stress exerted on a forging die during die forging.

Effect(s) of the Invention

The above aspect of the present invention serves to suppress a heat check from being yielded in a forging die upon die forging of a rack bar.

BRIEF DESCRIPTION OF THE DRAWINGS

FIG. 5A shows a state in which a stock has been set between forging dies. FIG. 5B shows a forging process. FIG. 5C shows a state in which a forged product has been released from the dies. FIG. 5D shows a burr removal process.

FIGS. 6A and 6B show analysis results of stress exerted on an upper die during die forging of the rack bar. FIG. 6A is a sectional view of a focused part of the rack bar according to the present invention. FIG. 6B is a sectional view of a focused part of a conventional rack bar.

MODE(S) FOR CARRYING OUT THE INVENTION

The following details embodiments of rack bars and steering devices according to the present invention, with reference to the drawings. Each of the embodiments below shows a rack bar employed in a steering device of a vehicle, as conventional.

First Embodiment (Configurations of Steering Device)

Figure 1:
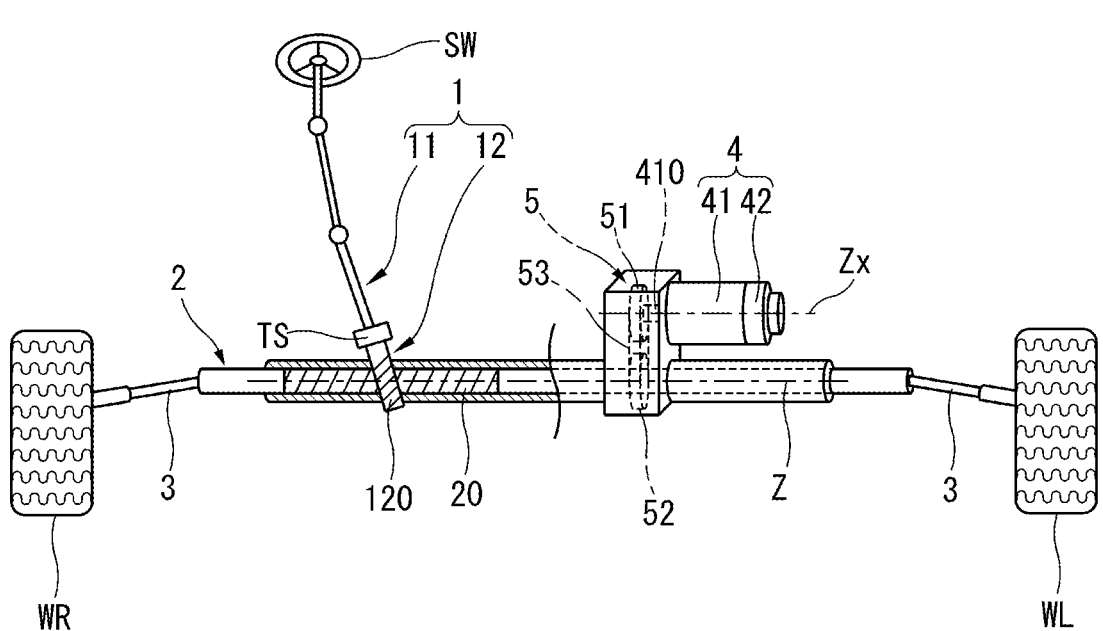
FIG. 1 is a schematic view of a steering device according to the present invention.

FIG. 1 is a schematic view of a steering device including a rack bar according to the first embodiment of the present invention.

The steering device shown in FIG. 1 includes a steering shaft 1 and a rack bar 2. Steering shaft 1 is structured to rotate in linkage with a steering wheel SW. Rack bar 2 is linked with steering shaft 1 via a known rack-and-pinion mechanism, and is structured to convert rotational motion of steering shaft 1 to axial motion and thereby transmit steering operation to turning wheels WR and WL.

Steering shaft 1 includes an input shaft 11 and a pinion shaft 12. Input shaft 11 includes a first end connected to steering wheel SW so as to be integrally rotatable with steering wheel SW. Pinion shaft 12 serves as an output shaft, and includes a first end connected to a second end of input shaft 11 so as to be relatively rotatable with respect to input shaft 11, and includes a second end being in engagement and connection with rack bar 2. Input shaft 11 is mechanically directly connected to steering wheel SW via a member such as a shaft joint. Pinion shaft 12 includes pinion teeth 120 engaging with rack teeth 20 of rack bar 2, in an outer periphery of the second end of pinion shaft 12 connected to rack bar 2. Input shaft 11 and pinion shaft 12 interpose therebetween a torque sensor TS configured to measure a steering torque by, for example, measuring a change in magnetic flux caused due to relative rotation between input shaft 11 and pinion shaft 12.

Rack bar 2 has a shape of a round bar extending straight in a direction of an axis Z, and includes rack teeth 20 structured to engage with pinion teeth 120 of pinion shaft 12. Pinion teeth 120 occupies a predetermined region in the direction of axis Z within which rack bar 2 engages with pinion shaft 12. Rack bar 2 includes first and second ends each of which is linked with a corresponding one of right and left turning wheels WR and WL via a tie rod 3 and a knuckle arm not shown. Thus, the steering device is structured such that axial movement of rack bar 2 pulls the knuckle arms via tie rods 3 and thereby turns turning wheels WR and WL right and left.

The steering device includes a steering assist mechanism structured to provide a steering assist torque depending on a steering torque of a driver for rack bar 2, based on measurement results of torque sensor TS disposed in steering shaft 1, a vehicle speed sensor not shown, etc. The steering assist mechanism includes a motor unit 4 and a transmitting mechanism 5. Motor unit 4 is a power source of the steering assist mechanism. Transmitting mechanism 5 is structured to transmit rotation of motor unit 4 to rack bar 2. Motor unit 4 includes an electric motor 41 and a controller 42. Controller 42 is integrated with electric motor 41, and controls driving of electric motor 41. Electric motor 41 includes a drive shaft 410 structured to rotate about an axis Zx parallel with axis Z of rack bar 2 and connected to rack bar 2 via transmitting mechanism 5. Controller 42 is disposed in a side of electric motor 41 opposite to drive shaft 410, and performs the driving control on electric motor 41 based on various measurement signals inputted from torque sensor TS, the vehicle speed sensor not shown, etc.

Transmitting mechanism 5 includes an input pulley 51, an output pulley 52, a ball screw mechanism not shown, and a belt 53. Input pulley 51 is disposed around drive shaft 410 of electric motor 41, and is structured to rotate about axis Zx integrally with drive shaft 410. Output pulley 52 is disposed around rack bar 2 so as to be rotatable relatively with respect to rack bar 2, and is structured to rotate about axis Z of rack bar 2. The ball screw mechanism not shown is disposed between output pulley 52 and rack bar 2, and is structured to decelerate rotation of output pulley 52 and convert it to axial motion of rack bar 2. Belt 53 is wound over two pulleys of input pulley 51 and output pulley 52, and is structured to transmit rotation of input pulley 51 to output pulley 52 and thereby cause output pulley 52 to rotate in synchronization with input pulley 51.

Although the steering device according to the present embodiment is exemplified as a rack assist type electric power steering device structured to perform steering assist by providing rotational force of electric motor 31 for rack bar 2, steering devices according to the present invention are not limited to such mode. For example, a steering device according to the present invention may be an electric power steering device of an assist mode other than the rack assist type, such as a pinion assist type one structured to perform steering assist by providing rotational force of electric motor 31 for pinion shaft 12.

Other than the electric power steering devices structured to perform steering assist with rotational force of electric motor 31, a steering device according to the present invention may be a power steering device based on another power source, such as a hydraulic power steering device structured to perform steering assist with oil pressure. Moreover, other than the steering device of the present embodiment including steering shaft 1 (in detail, input shaft 11) directly connected to steering wheel SW, a steering device according to the present invention may include steering shaft 1 (input shaft 11) separated from steering wheel SW, such as a steer-by-wire one, in which steering shaft 1 (input shaft 11) may be connected to steering wheel SW via a clutch not shown. Furthermore, other than the steering device for manual driving structured to receive steering force inputted from a driver via steering wheel SW, a steering device according to the present invention may be a steering device for automatic driving structured to receive steering force inputted from a power source such as an electric motor not shown without requiring steering operation of a driver.
(Configurations of Rack Bar)

Figure 2:
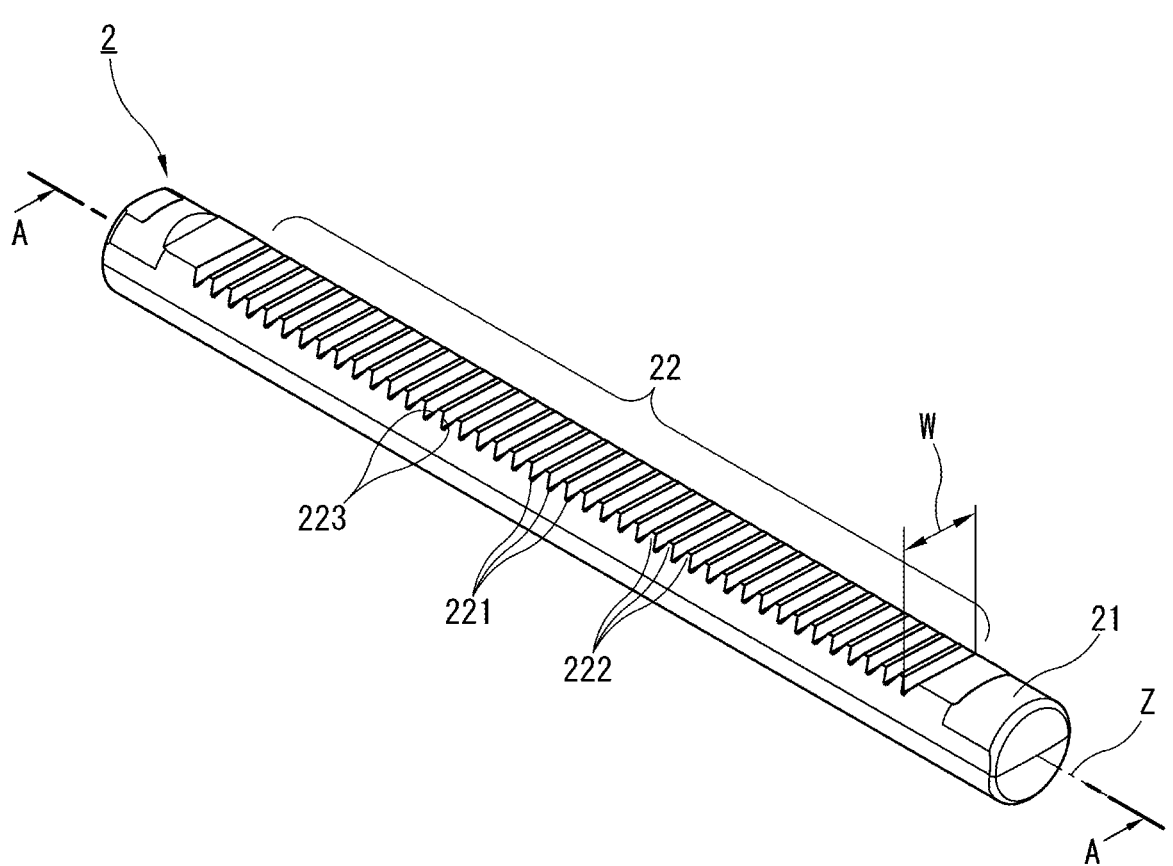
FIG. 2 is an oblique view of a rack bar shown in FIG. 1.

FIG. 2 is an oblique view of rack bar 2 shown in FIG. 1. Hereinafter, for convenience of explanation, "axial direction" is referred to as the direction of axis Z of rack bar 2, and "radial direction" is referred to as a direction orthogonal to axis Z of rack bar 2, and "circumferential direction" is referred to as a direction around axis Z of rack bar 2.

As shown in FIG. 2, rack bar 2 is integrally made of a metallic material such as an S45C, an S48C, or an iron-based material. Rack bar 2 includes a rack body 21 and a rack tooth molded part 22. Rack body 21 has a shape of a substantially round bar. Rack tooth molded part 22 includes rack teeth 20 formed by die forging, and extends in the axial direction while occupying a partial region of rack body 21 in the circumferential direction.

Rack body 21 is equivalent to a part excluding rack tooth molded part 22 out of an entire of rack bar 2. When viewed in the axial direction, rack body 21 has a substantially circular cross section in axial ranges excluding rack tooth molded part 22, and has a substantially D-shaped cross section in an axial range including rack tooth molded part 22.

Rack tooth molded part 22 is formed in a part of rack body 21 by causing the metallic material to plastically flow with use of forging dies (not shown) for the die forging. Rack teeth 20 of rack tooth molded part 22 are arranged in the axial direction, and each tooth of rack teeth 20 extends in a direction to cross axis Z at a predetermined helix angle. Rack teeth 20 of rack tooth molded part 22 include tooth bottom lands 221 and projecting teeth 222. Each of tooth bottom lands 221 is depressed with respect to an outer periphery of rack body 21 inwardly in the radial direction. Each of projecting teeth 222 is formed between a pair of tooth bottom lands 221 adjacent in the axial direction.

Tooth bottom lands 221 have a tooth width W extending in the direction to cross axis Z of rack bar 2 (i.e., rack body 21), and are arranged parallel with each other. Each of tooth bottom lands 221 is interposed between a pair of tooth surfaces 223 from both sides in the axial direction. Each of projecting teeth 222 taperingly projects outwardly in the radial direction.

Figure 3:
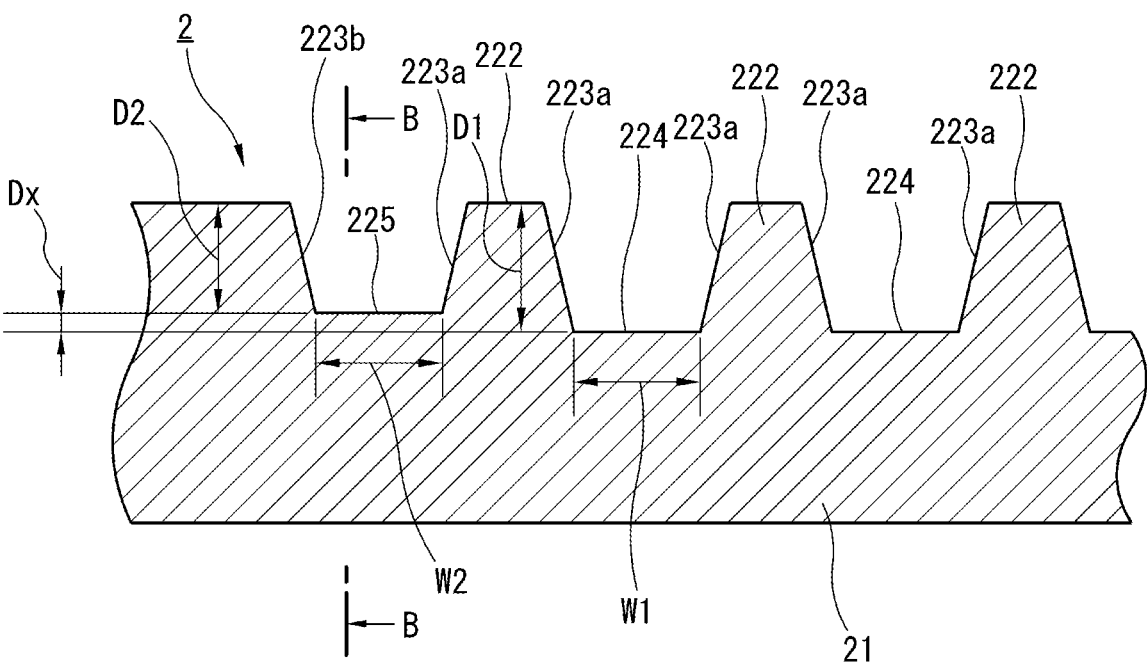
FIG. 3 is an enlarged view of a focused part in a longitudinal section of the rack bar along a line A-A shown in FIG. 2.
Figure 4:
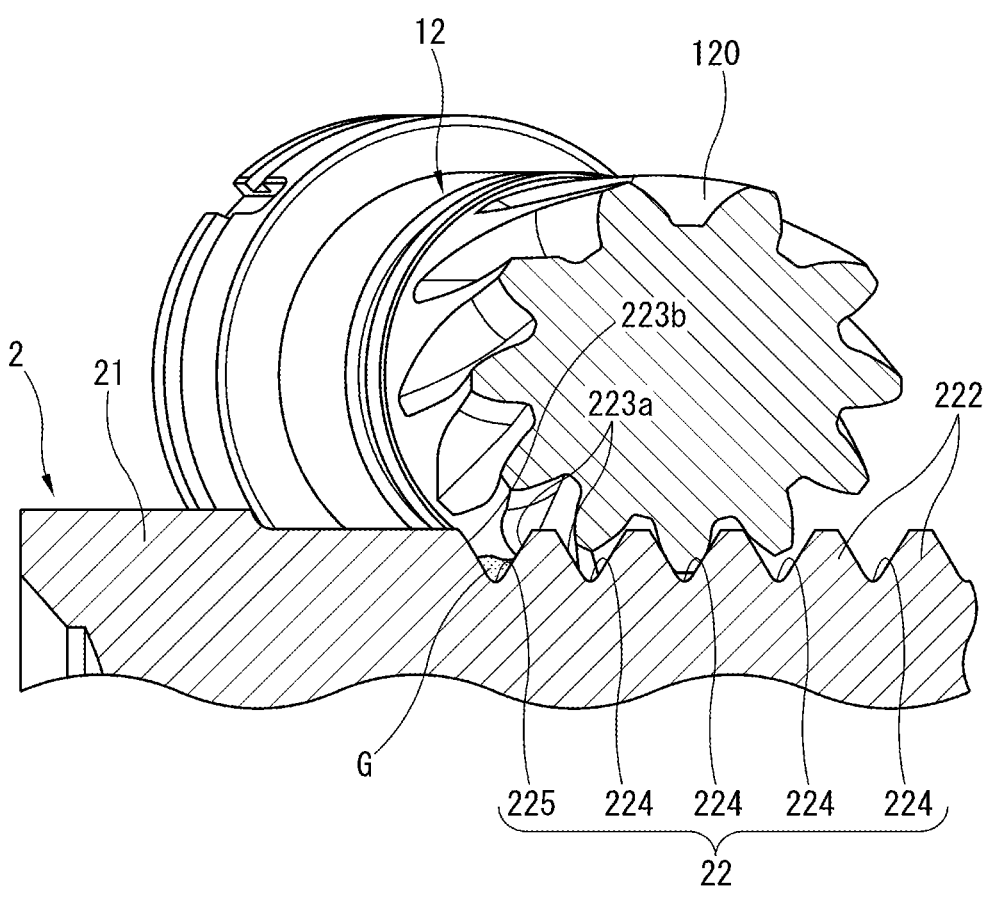
FIG. 4 is an arrow view showing how the rack bar in FIG. 2 engages with a pinion shaft.

FIG. 3 is a longitudinal sectional view of rack bar 2 along a line A-A shown in FIG. 2, and enlarges an endmost part of rack tooth molded part 22. FIG. 4 is an arrow view showing how rack teeth 20 and pinion teeth 120 engage with each other in an endmost part of rack tooth molded part 22 in the axial direction.

As shown in FIG. 3, tooth bottom lands 221 include ordinary tooth bottom lands 224 and endmost tooth bottom lands 225. Out of tooth bottom lands 221, ordinary tooth bottom lands 224 are ones disposed in a central region in the axial direction excluding a pair of endmost regions in the axial direction. Endmost tooth bottom lands 225 are endmost ones in the axial direction out of tooth bottom lands 221, and each of endmost tooth bottom lands 225 is structured to be less than any one of ordinary tooth bottom lands 224 in stress exerted on the forging dies not shown during the die forging. Ordinary tooth bottom lands 224 have a predetermined depth D1 and a predetermined width W1. Endmost tooth bottom lands 225 have a depth D2 less than depth D1 of ordinary tooth bottom lands 224 by a difference Dx, and have a width W2 equal to width W1 of ordinary tooth bottom lands 224. According to the present embodiment, rack tooth molded part 22 includes a pair of endmost tooth bottom lands 225, and each of the pair of endmost tooth bottom lands 225 is disposed in a corresponding one of both ends of rack tooth molded part 22 in the axial direction. Although the present embodiment exemplifies a case that each of the both ends of rack tooth molded part 22 in the axial direction includes one of endmost tooth bottom lands 225, the present invention is not limited to that. For example, each of the both ends of rack tooth molded part 22 in the axial direction may include a plurality of endmost tooth bottom lands 225.

Each of tooth surfaces 223 is inclined at a predetermined pressure angle θ. Tooth surfaces 223 include ordinary tooth surfaces 223a and endmost tooth surfaces 223b. Ordinary tooth surfaces 223a are formed at both sides of ordinary tooth bottom lands 224 in the axial direction. Endmost tooth surfaces 223b are formed at endmost parts of endmost tooth bottom lands 225 in the axial direction. As shown in FIG. 4, ordinary tooth surfaces 223a are structured to engage with pinion teeth 120 of pinion shaft 12, while endmost tooth surfaces 223b are structured not to contact with pinion shaft 12. In other words, endmost tooth bottom lands 225 serve to form so-called dummy teeth structured basically not to engage with pinion teeth 120. At least, endmost tooth surfaces 223b are structured not to engage with pinion teeth 120.

Furthermore, as shown especially in FIG. 4, rack teeth 20 and pinion teeth 120 have grease G applied to their surfaces for lubrication of engagement between rack teeth 20 and pinion teeth 120. When rack teeth 20 and pinion teeth 120 engage with each other and pinion shaft 12 moves to one of the axial ends of rack tooth molded part 22, grease G moves from ordinary tooth bottom lands 224 in the axially central region to a corresponding one of endmost tooth bottom lands 225, and is retained in the corresponding one of endmost tooth bottom lands 225.

(Production Method of Rack Bar)

Figure 5A:
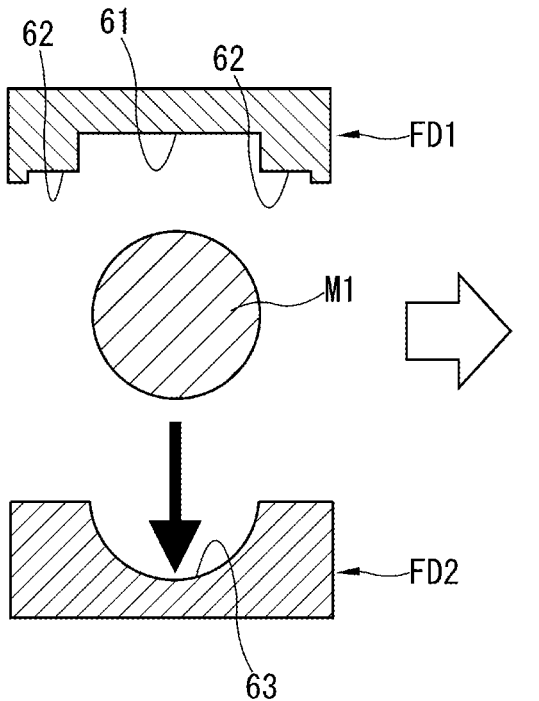
FIGS. 5A to 5D are views showing a production method (i.e., production processes) of the rack bar according to the present invention.
Figure 5B:
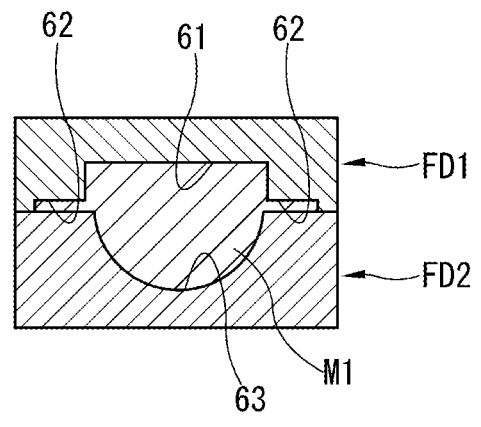
Figure 5C:
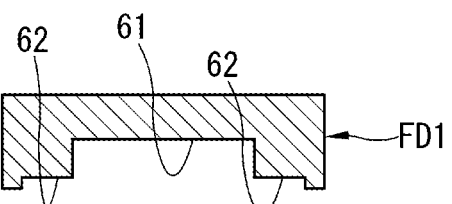
Figure 5D:
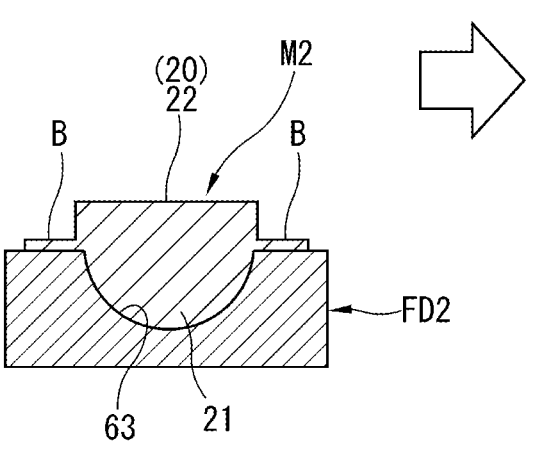
Figure 5D:
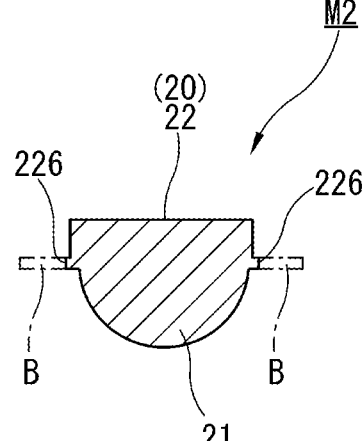

FIGS. 5A to 5D are cross sectional views of rack bar 2 showing a production method (i.e., production processes) of rack bar 2. FIG. 5A shows a state in which a stock M1 has been set between forging dies. FIG. 5B shows a forging process. FIG. 5C shows a state in which a forged member M2 has been released from the forging dies. FIG. 5D shows a burr removal process.

First, the following describes the forging dies used for production (i.e., die forging) of rack bar 2, with reference to FIG. 5A. The forging dies are composed of a first forging die FD1 and a second forging die FD2. First forging die FD1 is a movable die disposed at one side of rack body 21 (i.e., the stock) in the circumferential direction. Second forging die FD2 is a fixed die disposed at a side opposite to first forging die FD1 so as to face first forging die FD1. First forging die FD1 includes a rack former 61 and a pair of burr formers 62. Rack former 61 serves to form rack tooth molded part 22. The pair of burr formers 62 are disposed at both sides of rack former 61, and serve to form burrs B described below. Second forging die FD2 includes a stock supporter 63 having a substantially semi-circular cross section corresponding to an outline of stock M1, and thereby serves to support stock M1 during the die forging.

As shown in FIG. 5A, the production of rack bar 2 with use of the forging dies composed of first forging die FD1 and second forging die FD2 is started from raising first forging die FD1 to open the forging dies and setting stock M1 on stock supporter 63 of second forging die FD2.

Subsequently, as shown in FIG. 5B, the forging process, i.e. the die forging for transfer of rack former 61, is performed by moving first forging die FD1 down, sandwiching stock M1 between first forging die FD1 and second forging die FD2, and deforming stock M1 by pressure. In detail, the pressure onto stock M1 from rack former 61 of first forging die FD1 crushes a top end of stock M1, and causes crushed material to plastically flow into the pair of burr formers 62 at the axial both sides of rack former 61. This transfers rack former 61 and thereby forms rack tooth molded part 22 (i.e., rack teeth 20), while the pair of burr formers 62 form a pair of burrs B.

Thereafter, as shown in FIG. 5C, the forging dies are opened by raising first forging die FD1, and then forged member M2 produced by the die forging is took out. At last, as shown in FIG. 5D, the burr removal process is performed by cutting tips of the pair of burrs B formed due to the die forging and forming a pair of burr-removed parts 226, and the production of rack bar 2 is completed.

Effects of First Embodiment

Figures 6A, 6B:
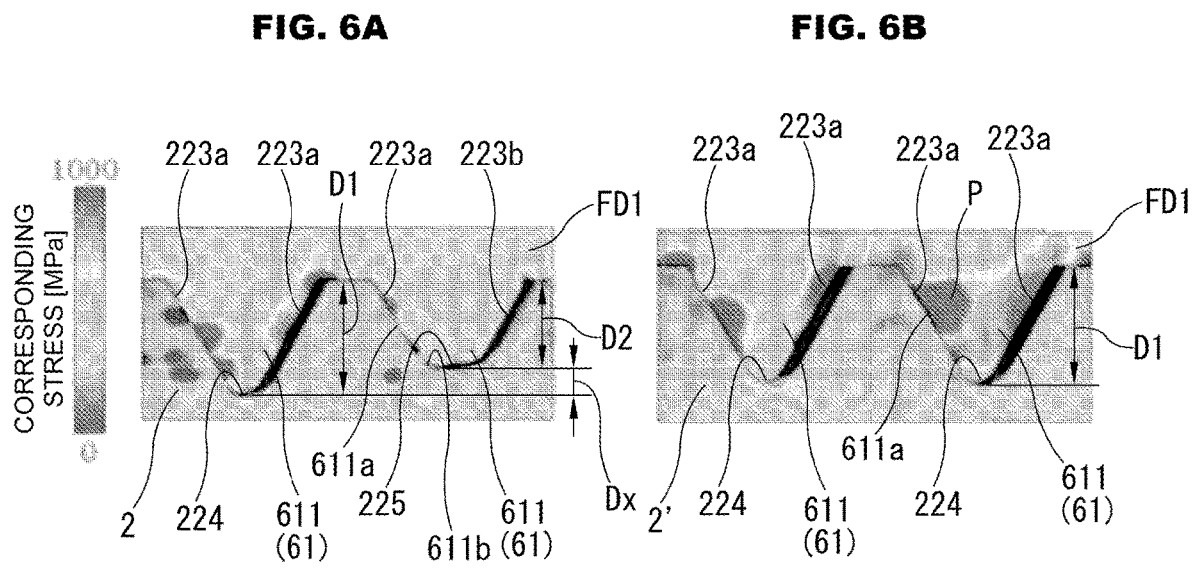

FIGS. 6A and 6B show analysis results of stress exerted on first forging die FD1 upon die forging of rack bar 2. FIG. 6A is a longitudinal sectional view of a focused part of rack bar 2 according to the present embodiment. FIG. 6B is a longitudinal sectional view of a focused part of a conventional rack bar 2'.

As shown in FIG. 6B, first forging die FD1 during die forging of conventional rack bar 2' undergoes a relatively great stress upon forming an endmost one of ordinary tooth bottom lands 224 of rack tooth molded part 22 which is an end of plastic flow of stock M1. Specifically, as shown by a dark color part P in FIG. 6B, the relatively great stress is exerted on a first tooth surface former 611a. First tooth surface former 611a is one of tooth bottom land formers 611 formed as projections in rack former 61 of first forging die FD1, and is structured to form an tooth surface (i.e., one of ordinary tooth surfaces 223a) adjacent to the endmost one of ordinary tooth bottom lands 224 from a side opposite to the endmost side. Thus, the relatively large stress may yield a so-called heat check such as a crack in first tooth surface former 611a of first forging die FD1. However, conventional rack bar 2' fails to consider the heat check.

On the other hand, according to the present embodiment, rack bar 2 is formed by die forging, and is structured to convert rotational motion of pinion shaft 12 rotating in linkage with steering wheel SW to axial motion and thereby transmit steering operation to turning wheels WR and WL, and includes: rack body 21 made of a metallic material and shaped to be a rod; and rack tooth molded part 22 formed in rack body 21 by causing the metallic material to plastically flow with use of the forging dies (i.e., first forging die FD1 and second forging die FD2) for the die forging. Rack tooth molded part 22 includes tooth bottom lands 221, projecting teeth 222, and tooth surfaces 223. Each of tooth bottom lands 221 is depressed with respect to the outer periphery of rack body 21 inwardly in the radial direction of the rack body 21. Tooth bottom lands 221 have tooth width W extending in the direction to cross axis Z of rack body 21, and are arranged parallel with each other, and include ordinary tooth bottom lands 224 and endmost tooth bottom lands 225. Ordinary tooth bottom lands 224 are ones of tooth bottom lands 221 that are disposed in the central region in the axial direction of rack body 21. Endmost tooth bottom lands 225 are endmost ones of tooth bottom lands 221 in the axial direction, and are structured to be less than ordinary tooth bottom lands 224 in stress exerted on the forging die during the die forging. Each of projecting teeth 222 is formed between a pair of tooth bottom lands 221 adjacent in the axial direction, and taperingly projects outwardly in the radial direction. Each of tooth bottom lands 221 is interposed between a pair of tooth surfaces 223 from both sides in the axial direction. Tooth surfaces 223 include a pair of tooth surfaces (i.e., endmost tooth surfaces 223*b*) that are endmost ones of tooth surfaces 223 in the axial direction and are structured not to contact with pinion shaft 12.

In other words, according to the present embodiment, the steering device includes: pinion shaft 12 structured to rotate in linkage with steering wheel SW; and rack bar 2 formed by die forging and structured to convert rotational motion of pinion shaft 12 to axial motion and thereby transmit steering operation to turning wheels WR and WL. Rack bar 2 includes rack body 21 made of a metallic material and shaped to be a rod, and includes rack tooth molded part 22 formed in rack body 21 by causing the metallic material to plastically flow with use of the forging dies (i.e., first forging die FD1 and second forging die FD2) for the die forging. Rack tooth molded part 22 includes tooth bottom lands 221, projecting teeth 222, and tooth surfaces 223. Each of tooth bottom lands 221 is depressed with respect to the outer periphery of rack body 21 inwardly in the radial direction of the rack body 21. Tooth bottom lands 221 have tooth width W extending in the direction to cross axis Z of rack body 21, and are arranged parallel with each other, and include ordinary tooth bottom lands 224 and endmost tooth bottom lands 225. Ordinary tooth bottom lands 224 are ones of tooth bottom lands 221 that are disposed in the central region in the axial direction of rack body 21. Endmost tooth bottom lands 225 are endmost ones of tooth bottom lands 221 in the axial direction, and are structured to be less than ordinary tooth bottom lands 224 in stress exerted on the forging die during the die forging. Each of projecting teeth 222 is formed between a pair of tooth bottom lands 221 adjacent in the axial direction, and taperingly projects outwardly in the radial direction. Each of tooth bottom lands 221 is interposed between a pair of tooth surfaces 223 from both sides in the axial direction. Tooth surfaces 223 include a pair of tooth surfaces (i.e., endmost tooth surfaces 223*b*) that are endmost ones of tooth surfaces 223 in the axial direction and are structured not to contact with pinion shaft 12.

Thus, rack bar 2 according to the present embodiment and the steering device employing it are configured to include, as endmost ones of the tooth bottom lands, endmost tooth bottom lands 225 structured to reduce a stress exerted on first forging die FD1 during the die forging of rack tooth molded part 22. Specifically, according to the present embodiment, endmost tooth bottom lands 225 have depth D2 shallower than depth D1 of ordinary tooth bottom lands 224.

According to the present embodiment, depth D2 of endmost tooth bottom lands 225 is shallower than depth D1 of ordinary tooth bottom lands 224 by difference Dx. This reduces an amount of the material flowing upon forming the endmost tooth bottom lands 225, by an amount corresponding to difference Dx. This serves to reduce the stress exerted on first tooth surface former 611*a* of first forging die FD1 as shown in FIG. 6A, and thereby suppress first tooth surface former 611*a* of first forging die FD1 from undergoing the heat check.

Moreover, according to the present embodiment, each of the pair of axial ends of rack tooth molded part 22 includes one of endmost tooth bottom lands 225 shallower than depth D1 of ordinary tooth bottom lands 224.

The configuration of each of the axial ends of rack tooth molded part 22 including one endmost tooth bottom land 225 serves to downsize rack tooth molded part 22 in comparison with a case of each of the axial ends of rack tooth molded part 22 including a plurality of endmost tooth bottom lands 225, and thereby downsize rack bar 2.

Furthermore, according to the present embodiment, each of endmost tooth bottom lands 225 retains grease G.

Grease G is retained on endmost tooth bottom lands 225 structured not to engage with pinion teeth 120. This causes oil of grease G on endmost tooth bottom lands 225 to flow (i.e., exude) to ordinary tooth bottom lands 224, and thereby serves for lubrication between pinion teeth 120 and ordinary tooth surfaces 223*a* connected to ordinary tooth bottom lands 224.

Second Embodiment

Figure 7:
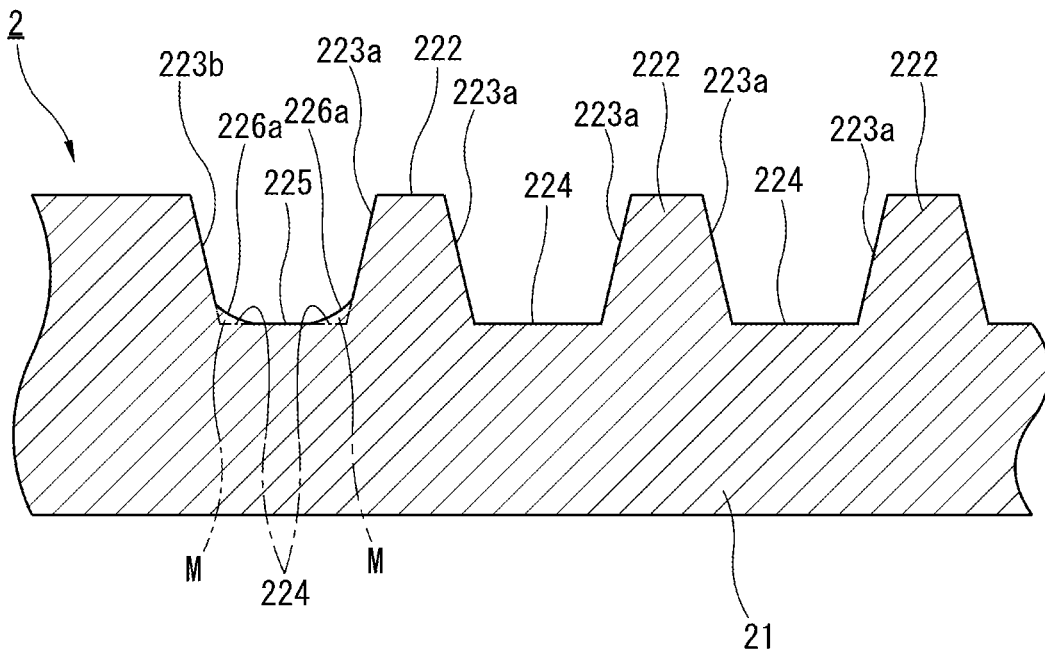
FIG. 7 is a view corresponding to FIG. 3 which shows a rack bar according to a second embodiment of the present invention.

FIG. 7 shows a rack bar and a steering device according to the second embodiment of the present invention. The second embodiment is different from the first embodiment in configurations of endmost tooth bottom lands 225, and is same with the first embodiment in the other configurations. Accordingly, the configurations same with the first embodiment are represented by same reference signs, and explanation thereof is omitted.

Configurations of Rack Bar

As shown in FIG. 7, the rack bar and the steering device according to the present embodiment are configured to include curved parts 226*a*. Each of curved parts 226*a* is a chamfered part having an arc-shaped longitudinal section, and is formed to connect endmost tooth bottom land 225 with ordinary tooth surface 223*a* adjacent to the tooth bottom land 225 from an axial first side (i.e., the side opposite to the endmost side) or connect endmost tooth bottom land 225 with endmost tooth surface 223*b* adjacent to the tooth bottom land 225 from an axial second side (i.e., the endmost side).

Thus, according to the present embodiment, the flowing amount of stock M1 upon forming one endmost tooth bottom land 225, i.e., an amount of thickness removal upon forming one endmost tooth bottom land 225, is less than one ordinary tooth bottom land 224 by an amount corresponding to curved parts 226*a*. In other words, curved parts 226*a* cause thickness remainder parts M at axial both sides of endmost tooth bottom land 225 to be greater in amount than ordinary tooth bottom land 224 (see virtual lines in FIG. 7).

Curved parts 226*a* exemplified in the present embodiment show a favorable aspect of chamfered parts formed between endmost tooth bottom land 225 and ordinary tooth bottom land 224 and between endmost tooth bottom land 225 and endmost tooth surface 223*b*. The chamfered parts formed between endmost tooth bottom land 225 and ordinary tooth bottom land 224 and between endmost tooth bottom land 225 and endmost tooth surface 223*b* is not limited to curved parts 226*a* exemplified in the present embodiment, but may be configured as chamfered parts 226*b* each of which has a flat slope such as a so-called C chamfer plane.

Effects of Second Embodiment

As described above, according to the present embodiment, the rack bar and the steering device are configured such that each of pairs of tooth surfaces 223 (i.e., ordinary tooth surfaces 223*a* and endmost tooth surfaces 223*b*)

interposing one of endmost tooth bottom lands 225 from the both sides in the axial direction is connected to the one of endmost tooth bottom lands 225 via one of curved parts 226*a* (or one of chamfered parts 226*b*).

According to the present embodiment, each of curved parts 226*a* (or chamfered parts 226*b*) is formed between one of endmost tooth bottom lands 225 and one of the tooth surfaces (i.e., ordinary tooth surfaces 223*a* and endmost tooth surfaces 223*b*) continuous to the one of endmost tooth bottom lands 225. This causes the thickness removal amount upon forming one endmost tooth bottom land 225, i.e., the flowing amount of stock M1 upon forming one endmost tooth bottom land 225, to be less than one ordinary tooth bottom lands 224 by the amount corresponding to curved parts 226*a*. This reduces a surface pressure exerted on a corner 611*b* (see FIG. 6A) of tooth bottom land formers 611 of first forging die FD1 during die forging of rack tooth molded part 22. This serves to suppress first forging die FD1 from undergoing local concentration of stress on corner 611*b* of tooth bottom land formers 611 upon forming endmost tooth bottom lands 225, and thereby suppress first forging die FD1 from undergoing the heat check.

Third Embodiment

Figure 8:
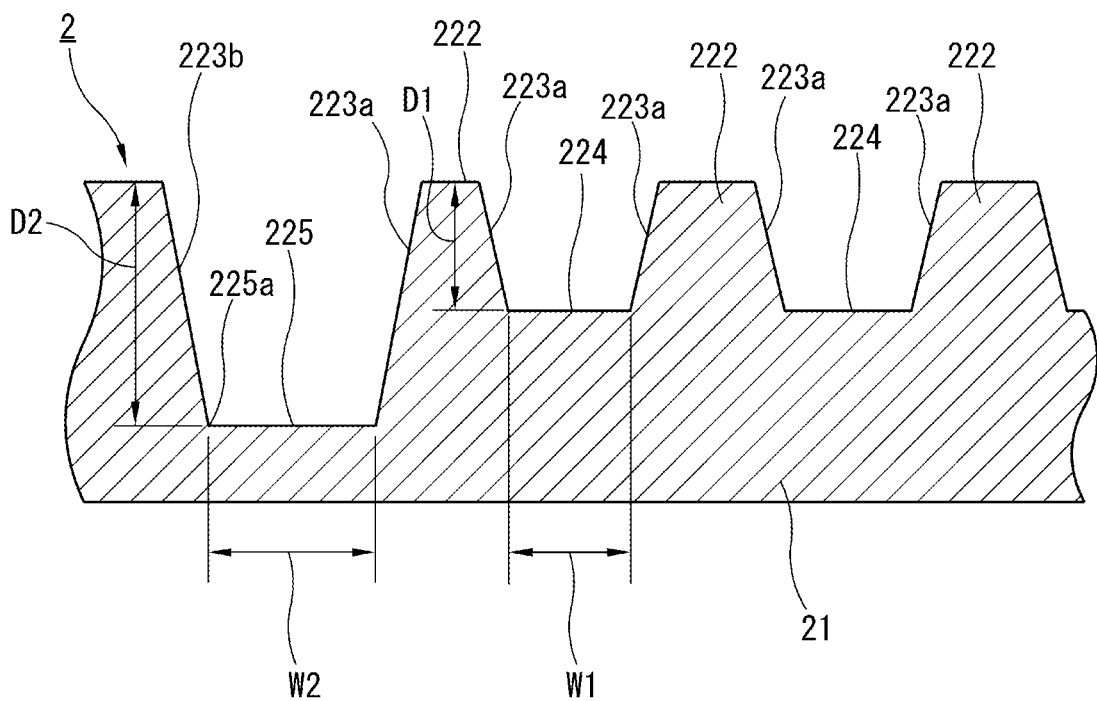
FIG. 8 is a view corresponding to FIG. 3 which shows a rack bar according to a third embodiment of the present invention.

FIG. 8 shows a rack bar and a steering device according to the third embodiment of the present invention. The third embodiment is different from the first embodiment in configurations of endmost tooth bottom lands 225, and is same with the first embodiment in the other configurations. Accordingly, the configurations same with the first embodiment are represented by same reference signs, and explanation thereof is omitted.
(Configurations of Rack Bar)

As shown in FIG. 8, the rack bar and the steering device according to the present embodiment are configured such that width W2 being an axial length of endmost tooth bottom lands 225 is greater than width W1 being an axial length of ordinary tooth bottom lands 224.

Although the present embodiment shows depth D2 of endmost tooth bottom lands 225 greater than depth D1 of ordinary tooth bottom lands 224, the present invention is not limited to that. For example, according to the present invention, depth D2 of endmost tooth bottom lands 225 may be equal to or less than depth D1 of ordinary tooth bottom lands 224, provided that width W2 of endmost tooth bottom lands 225 is greater than width W1 of ordinary tooth bottom lands 224.

Effects of Third Embodiment

As described above, the rack bar and the steering device according to the present embodiment are configured such that the length (i.e., width W2) of endmost tooth bottom lands 225 is greater than the length (i.e., width W1) of ordinary tooth bottom lands 224, when viewed in the axial direction.

The configuration of setting width W2 of endmost tooth bottom lands 225 to be greater than width W1 of ordinary tooth bottom lands 224 reduces the surface pressure exerted on corner 611*b* (see FIG. 6A) of tooth bottom land formers 611 of first forging die FD1 upon die forming of rack tooth molded part 22. This serves to suppress first forging die FD1 from undergoing local concentration of stress on corner 611*b* of tooth bottom land formers 611 upon forming endmost tooth bottom lands 225, and thereby suppress first forging die FD1 from undergoing the heat check.

Figure 9:
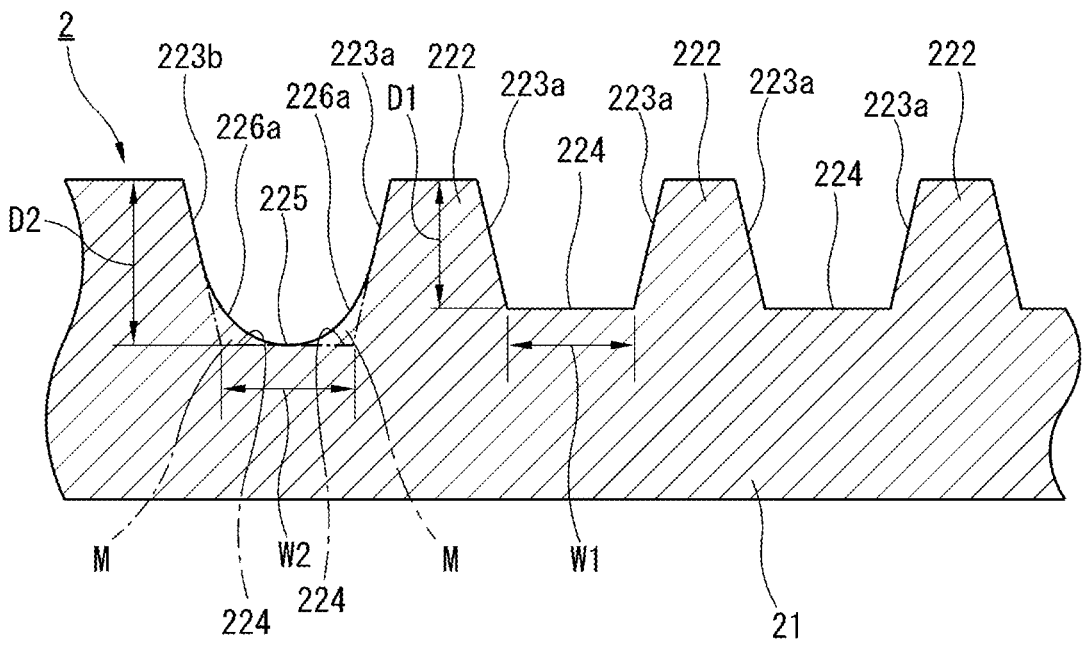
FIG. 9 is a view corresponding to FIG. 3 which shows a rack bar according to a fourth embodiment of the present invention.

Although the present embodiment exemplifies endmost tooth bottom lands 225 connected to ordinary tooth surfaces 223*a* and endmost tooth surfaces 223*b* via corners 225*a*, the present invention is not limited to that. For example, according to the present invention, endmost tooth bottom lands 225 may be connected to ordinary tooth surfaces 223*a* and endmost tooth surfaces 223*b* via curved parts 226*a* disclosed in the second embodiment above as shown in FIG. 9, provided that width W2 of endmost tooth bottom lands 225 is set greater than width W1 of ordinary tooth bottom lands 224.

Fourth Embodiment

Figure 10:
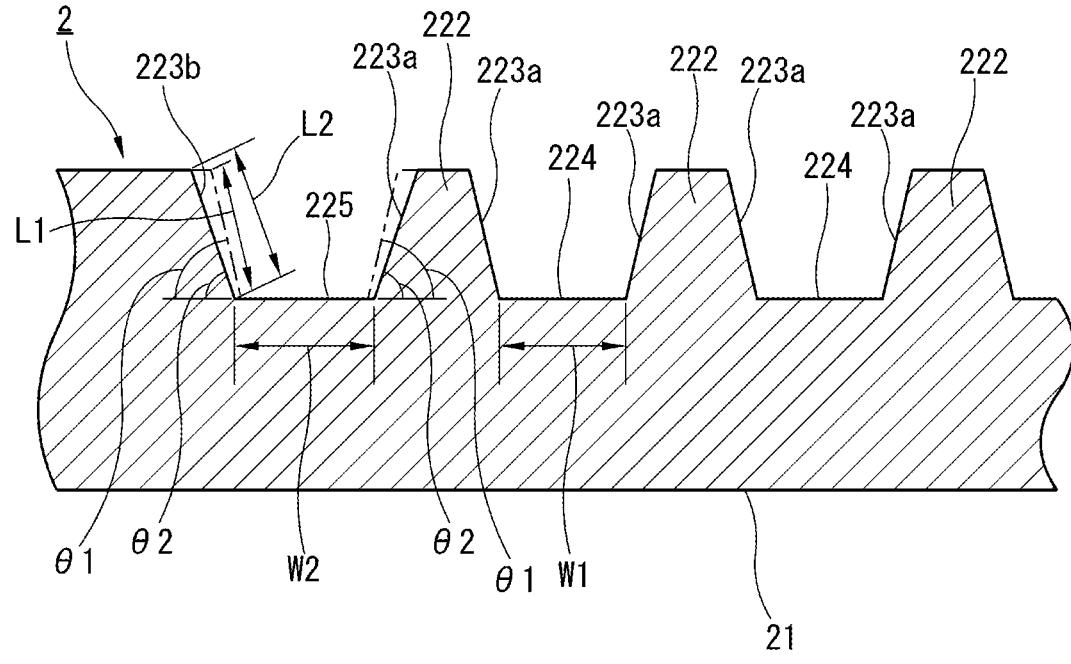
FIG. 10 is a view corresponding to FIG. 3 which shows a rack bar according to a fifth embodiment of the present invention.

FIG. 10 shows a rack bar and a steering device according to the fourth embodiment of the present invention. The fourth embodiment is different from the first embodiment in configurations of endmost tooth bottom lands 225, and is same with the first embodiment in the other configurations. Accordingly, the configurations same with the first embodiment are represented by same reference signs, and explanation thereof is omitted.
(Configurations of Rack Bar)

As shown in FIG. 10, a rack bar and a steering device according to the present embodiment are configured such that endmost tooth bottom land 225 and ordinary tooth surface 223*a* continuous to the endmost tooth bottom land 225 from the axial first side (i.e., the side opposite to the endmost side) form therebetween an angle $\theta 2$ greater than an angle $\theta 1$ formed between ordinary tooth bottom land 224 and ordinary tooth surface 223*a* continuous to the ordinary tooth bottom land 224 (see a virtual line in FIG. 10), and also endmost tooth bottom land 225 and endmost tooth surface 223*b* continuous to the endmost tooth bottom land 225 from the axial second side (i.e., the endmost side) form therebetween angle $\theta 2$ greater than angle $\theta 1$. In other words, according to the present embodiment, ordinary tooth surface 223*a* continuous to endmost tooth bottom land 225 has a length L2 longer than a length L1 of ordinary tooth surface 223*a* continuous to ordinary tooth bottom land 224, and also endmost tooth surface 223*b* continuous to endmost tooth bottom land 225 has length L2 longer than length L1.

Although the present embodiment exemplifies depth D2 of endmost tooth bottom lands 225 to be greater than depth D1 of ordinary tooth bottom lands 224 and depth W2 of endmost tooth bottom lands 225 to be greater than depth W1 of ordinary tooth bottom lands 224, the present invention is not limited to that. For example, according to the present invention, depth D2 and width W2 of endmost tooth bottom lands 225 may be respectively equal to or less than depth D1 and width W1 of ordinary tooth bottom lands 224, provided that angle $\theta 2$ formed between endmost tooth bottom lands 225 and ordinary tooth surfaces 223*a* continuous to them and between endmost tooth bottom lands 225 and endmost tooth surfaces 223*b* continuous to them is greater than angle $\theta 1$ formed between ordinary tooth bottom lands 224 and ordinary tooth surfaces 223*a* continuous to them.

Effects of Fourth Embodiment

As described above, the rack bar and the steering device according to the present embodiment are configured such that endmost tooth bottom lands 225 and tooth surfaces 223 (i.e., ordinary tooth surfaces 223*a* and endmost tooth surfaces 223*b*) interposing endmost tooth bottom lands 225 from both sides in the axial direction form angle $\theta 2$ greater than angle $\theta 1$ formed between ordinary tooth bottom lands 224 and tooth surfaces 223 (i.e., ordinary tooth surfaces 223a) interposing ordinary tooth bottom lands 224.

Thus, according to the present embodiment, angle θ2 formed between endmost tooth bottom lands 225 and the tooth surfaces (i.e., ordinary tooth surfaces 223a and endmost tooth surfaces 223b) continuous to endmost tooth bottom lands 225 is greater than angle θ1 formed between ordinary tooth bottom lands 224 and ordinary tooth surfaces 223a continuous to ordinary tooth bottom lands 224. This allows length L2 of ordinary tooth surfaces 223a and endmost tooth surfaces 223b continuous to endmost tooth bottom lands 225 to be longer than length L1 of ordinary tooth surfaces 223a continuous to ordinary tooth bottom lands 224. This reduces a surface pressure exerted on a tooth surface 611c of tooth bottom land formers 611 of first forging die FD1 during the die forming of rack tooth molded part 22 (see FIG. 6A). This serves to suppress first forging die FD1 from undergoing local concentration of stress on tooth surface 611c of tooth bottom land formers 611 upon forming endmost tooth bottom lands 225, and thereby suppress first forging die FD1 from undergoing the heat check.

Fifth Embodiment

Figure 11:
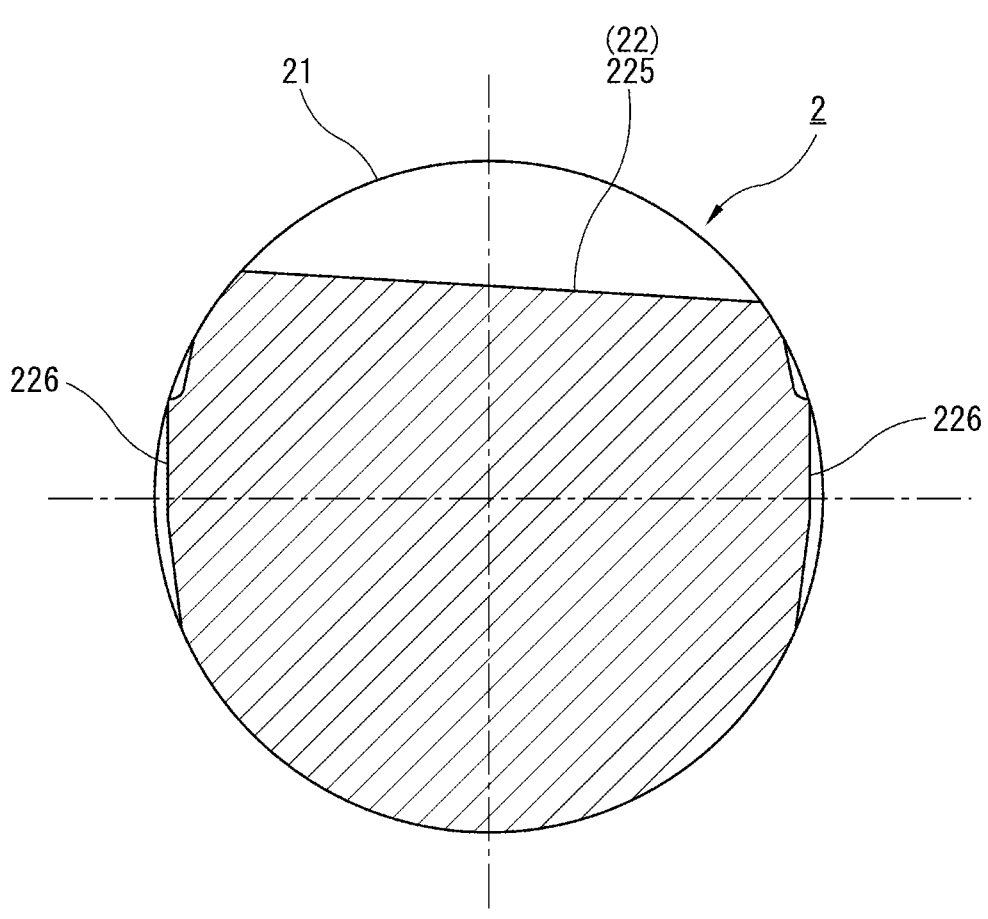
FIG. 11 is a cross sectional view along a line B-B shown in FIG. 3, which shows a rack bar according to a sixth embodiment of the present invention.

FIG. 11 shows a rack bar and a steering device according to the fifth embodiment of the present invention. The fourth embodiment is different from the first embodiment in configurations of endmost tooth bottom lands 225, and is same with the first embodiment in the other configurations. Accordingly, the configurations same with the first embodiment are represented by same reference signs, and explanation thereof is omitted.
(Configurations of Rack Bar)

As shown in FIG. 11, a rack bar and a steering device according to the present embodiment are configured such that depth D2 of endmost tooth bottom lands 225 of rack tooth molded part 22 varies in a direction to cross the axis Z of rack body 21. Specifically, the depth of endmost tooth bottom land 225 is relatively great in a width direction first end (i.e., a right side in FIG. 11) structured to engage with the pinion teeth not shown, for ensuring the engagement with the pinion teeth. On the other hand, the depth of endmost tooth bottom lands 225 is relatively small in a width direction second end (i.e., a left side in FIG. 11) structured not to engage with the pinion teeth. Thus, depth D2 of endmost tooth bottom lands 225 varies to form a slope rising from the width direction first end to the width direction second end. In other words, tooth bottom lands 225 gradually decrease in distance S to tooth tips 222a of projecting teeth 222 as going from the width direction first end to the width direction second end.

Effects of Fifth Embodiment

As described above, the rack bar and the steering device according to the present embodiment are configured such that each of endmost tooth bottom lands 225 varies in depth, in the direction to cross axis Z of rack body 21.

As described above, according to the present embodiment, depth D2 of endmost tooth bottom lands 225 is different between a region to engage with pinion shaft 12 (in detail, pinion teeth 120) and a region not to engage with pinion shaft 12 (pinion teeth 120). Specifically, depth D2 of endmost tooth bottom lands 225 is relatively deep in the width direction first end structured to engage with pinion teeth 120, and is relatively small in the width direction second end structured not to engage with pinion teeth 120.

This serves to minimize the flow amount of stock M1 in endmost tooth bottom lands 225 upon die forging of rack bar 2, and thereby suppress first forging die 5 FD1 from undergoing the heat check upon the die forging of rack bar 2.

The present invention is not limited to the embodiments described above, but may be freely modified depending on conditions such as specifications of rack bar 2 10 and a steering device employing the rack bar 2.

The invention claimed is:

1. A rack bar formed by die forging and structured to convert rotational motion of a pinion shaft rotating in linkage with a steering wheel to axial motion and thereby transmit steering operation to a turning wheel, the rack bar comprising:

a rack body made of a metallic material and shaped to be a rod; and a rack tooth molded part formed in the rack body by causing the metallic material to plastically flow with use of a forging die for the die forging, and provided with a plurality of rack teeth, wherein:

the rack tooth molded part includes tooth bottom lands, a projecting tooth, and tooth surfaces;

each of the tooth bottom lands is depressed with respect to an outer periphery of the rack body inwardly in a radial direction of the rack body;

the tooth bottom lands have a tooth width extending in a direction to cross an axis of the rack body, and are arranged parallel with each other, and include an ordinary tooth bottom land and an endmost tooth bottom land;

the ordinary tooth bottom land is one of the tooth bottom lands that is disposed in a central region in an axial direction of the rack body;

the endmost tooth bottom land is an endmost one of the tooth bottom lands in the axial direction, and is structured to be less than the ordinary tooth bottom land in stress exerted on the forging die during the die forging;

the projecting tooth is formed between a pair of the tooth bottom lands adjacent in the axial direction, and taperingly projects outwardly in the radial direction;

each of the tooth bottom lands is interposed between a pair of the tooth surfaces from both sides in the axial direction;

the tooth surfaces include a tooth surface that is an endmost one of the tooth surfaces in the axial direction and is structured not to contact with the pinion shaft; and the endmost tooth bottom land varies in depth, in a direction of a width of the rack tooth which is a direction in which the endmost tooth bottom land extends.

2. The rack bar as claimed in claim 1, wherein the endmost tooth bottom land is less in depth than the ordinary tooth bottom land.

3. The rack bar as claimed in claim 2, wherein:

the rack tooth molded part includes a pair of the endmost tooth bottom lands less in depth than the ordinary tooth bottom land; and the rack tooth molded part includes a pair of ends in the axial direction each of which includes one of the pair of the endmost tooth bottom lands.

4. The rack bar as claimed in claim 1, wherein the endmost tooth bottom land retains grease.

5. The rack bar as claimed in claim 1, wherein the endmost tooth bottom land is greater in length in the axial direction than the ordinary tooth bottom land.

6. The rack bar as claimed in claim 1, wherein each of the pair of the tooth surfaces interposing the endmost tooth bottom land from the both sides in the axial direction is connected to the endmost tooth bottom land via a curved part or a chamfered part.

7. The rack bar as claimed in claim 1, wherein the endmost tooth bottom land and each of the pair of the tooth surfaces interposing the endmost tooth bottom land from the both sides in the axial direction form an angle greater than an angle formed between the ordinary tooth bottom land and the tooth surfaces interposing the ordinary tooth bottom land.

8. A steering device comprising:

a pinion shaft structured to rotate in linkage with a steering wheel; and a rack bar formed by die forging and structured to convert rotational motion of the pinion shaft to axial motion and thereby transmit steering operation to a turning wheel, wherein:

the rack bar includes a rack body made of a metallic material and shaped to be a rod, and includes a rack tooth molded part formed in the rack body by causing the metallic material to plastically flow with use of a forging die for the die forging, and provided with a plurality of rack teeth;

the rack tooth molded part includes tooth bottom lands, a projecting tooth, and tooth surfaces;

each of the tooth bottom lands is depressed with respect to an outer periphery of the rack body inwardly in a radial direction of the rack body;

the tooth bottom lands have a tooth width extending in a direction to cross an axis of the rack body, and are arranged parallel with each other, and include an ordinary tooth bottom land and an endmost tooth bottom land;

the ordinary tooth bottom land is one of the tooth bottom lands that is disposed in a central region in an axial direction of the rack body;

the endmost tooth bottom land is an endmost one of the tooth bottom lands in the axial direction, and is structured to be less than the ordinary tooth bottom land in stress exerted on the forging die during the die forging;

the projecting tooth is formed between a pair of the tooth bottom lands adjacent in the axial direction, and taperingly projects outwardly in the radial direction;

each of the tooth bottom lands is interposed by a pair of the tooth surfaces from both sides in the axial direction;

the tooth surfaces include a tooth surface that is an endmost one of the tooth surfaces in the axial direction and is structured not to contact with the pinion shaft; and the endmost tooth bottom land varies in depth, in a direction of a width of the rack tooth which is a direction in which the endmost tooth bottom land extends.

9. The steering device as claimed in claim 8, wherein the endmost tooth bottom land is less in depth than the ordinary tooth bottom land.

10. The steering device as claimed in claim 9, wherein:

the rack tooth molded part includes a pair of the endmost tooth bottom lands less in depth than the ordinary tooth bottom land; and the rack tooth molded part includes a pair of ends in the axial direction each of which includes one of the pair of the endmost tooth bottom lands.

11. The steering device as claimed in claim 8, wherein the endmost tooth bottom land retains grease.

12. The steering device as claimed in claim 8, wherein the endmost tooth bottom land is greater in length in the axial direction than the ordinary tooth bottom land.

13. The steering device as claimed in claim 8, wherein each of the pair of the tooth surfaces interposing the endmost tooth bottom land from the both sides in the axial direction is connected to the endmost tooth bottom land via a curved part or a chamfered part.

14. The steering device as claimed in claim 8, wherein the endmost tooth bottom land and each of the pair of the tooth surfaces interposing the endmost tooth bottom land from the both sides in the axial direction form an angle greater than an angle formed between the ordinary tooth bottom land and the tooth surfaces interposing the ordinary tooth bottom land.

* * * * *